(12) United States Patent
Wang et al.

(10) Patent No.: US 10,074,391 B1
(45) Date of Patent: Sep. 11, 2018

(54) SPIRAL-BASED SELF-SERVO-WRITE ON SINGLE DISK SURFACE

(71) Applicant: KABUSHIKI KAISHA TOSHIBA, Tokyo (JP)

(72) Inventors: Zhi Wang, Palo Alto, CA (US); Jiangang Liang, Saratoga, CA (US)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 15/453,874

(22) Filed: Mar. 8, 2017

(51) Int. Cl.
G11B 21/02 (2006.01)
G11B 5/596 (2006.01)
G11B 5/012 (2006.01)

(52) U.S. Cl.
CPC .......... *G11B 5/59661* (2013.01); *G11B 5/012* (2013.01); *G11B 5/59638* (2013.01)

(58) Field of Classification Search
None
See application file for complete search history.

(56) References Cited

U.S. PATENT DOCUMENTS 7,133,239 B1 * 11/2006 Hartman ............ G11B 5/59638
360/75
7,139,144 B1 * 11/2006 Hartman ............ G11B 5/59638
360/51
7,499,234 B1 * 3/2009 Rigney ............ G11B 5/59638
360/75
7,619,846 B2 * 11/2009 Shepherd ........... G11B 5/59644
360/75
8,982,490 B1 * 3/2015 Park .................... G11B 5/59666
360/48
9,064,517 B1 6/2015 Neos et al.
9,208,810 B1 * 12/2015 Nie .................... G11B 5/59661

* cited by examiner

*Primary Examiner* — K. Wong
(74) *Attorney, Agent, or Firm* — Patterson & Sheridan, LLP (57) ABSTRACT

A hard disk drive (HDD) is configured to move a read head over a region of a storage surface that includes unreadable segments of reference spirals that have been overwritten by a reference spiral in a set of spirals that is currently being written on the storage surface. By moving the read head across the region of the storage surface at a return radial velocity that is selected such that the write head crosses no consecutive reference spirals at an unreadable segment, the servo system of the HDD does not experience an error due to crossing multiple consecutive reference spirals at unreadable segments. Thus, a set of spirals that includes partially damaged reference spirals can be employed to control the position of a read head. Consequently, a second surface is not required for the set of spirals employed in controlling the writing process.

20 Claims, 8 Drawing Sheets

SPIRAL-BASED SELF-SERVO-WRITE ON SINGLE DISK SURFACE

BACKGROUND

In a typical hard disk drive (HDD), servo sectors on the disk are used to provide position information about the location of a magnetic head over a disk surface. A common approach for writing such servo information on one or more disk surfaces in an HDD is referred to as spiral-based self-servo writing, or spiral-based SSW. According to this approach, multiple spiral-shaped servo information patterns (or "servo spirals") are written on at least one disk surface prior to the SSW process. During the SSW process, a magnetic head of the HDD is positioned relative to a disk surface based on timing and position information in the servo spirals, so that the final servo information (the servo sectors) can be written on the disk surface by the magnetic head.

For an error-free and robust SSW process, the servo spirals used should be precisely written on the disk surface with a predetermined and constant slope. Such servo spirals may be written on the disk surface with an external media writer before assembly of the disk drive, or with a servo writing machine that uses an external precision actuator to position the disk drive actuator with a mechanical push pin through an opening in the disk drive housing. In either case, setup and use of such external equipment for each individual HDD is time-consuming and expensive in the context of high-volume manufacturing.

In light of this, in-drive spiral-writing schemes have been employed, in which an HDD itself writes servo spirals prior to performing the SSW process. For example, a set of coarsely positioned spirals may be written by the HDD while the actuator is moved across a disk surface by applying a suitable open-loop voltage profile, or by using velocity control that is based on back electromotive force (back-EMF) feedback. More precisely positioned sets of spirals can then be written in one or more subsequent closed-loop spiral-writing processes, by demodulating signals from the more coarsely positioned sets of spirals. For example, a set of coarse servos spirals, a set of fine servo spirals, and a set of final servos spirals may be progressively written by the HDD itself in this way. The servo sectors are then written on a disk surface by positioning the magnetic head based on the final, most accurately positioned set of servo spirals.

Generally, the different sets of servo spirals are written on different recording surfaces of an HDD, so that the writing of one set of servo spirals does not overwrite portions of the servo spirals being used to position the magnetic head. However, for an HDD that only has a single data storage surface, a set of servo spirals being written on the single data storage surface necessarily overwrites portions of the pre-existing set of servo spirals (i.e., the reference spirals) that are required to control magnetic head position. Crossing a reference servo spiral at a location that has been overwritten, and therefore is unreadable, prevents the servo system of the HDD from collecting position information for the magnetic head, which can adversely affect the ability of the servo system to accurately control magnetic head position. While crossing a single reference spiral at an unreadable location can be a recoverable event for a typical HDD servo system, crossing two or more consecutive reference servo spirals at such unreadable locations is likely to cause an error in the SSW process. Because a blank-disk SSW process performed in a single-surface HDD causes hundreds or thousands of unreadable locations to be formed on the reference servo spirals being used to control magnetic head position, the likelihood of the magnetic head crossing two, three, or more consecutive reference spirals at unreadable locations at least once in the SSW process is extremely high. Therefore, most or all single-surface HDDs employing such a blank-disk SSW process can be expected to fail during the SSW process. As a result, the above-described blank-disk SSW process is not practicable on such single recording-surface HDDs.

SUMMARY

One or more embodiments provide systems and methods for single-surface blank-disk self-servo writing (SSW) on a hard disk drive (HDD). The HDD is configured to write a servo spiral on a data storage surface of the HDD from a first radial location on the data storage surface to a second radial location on the data storage surface. While writing the servo spiral, the HDD controls the radial position of a write head based on signals generated by a read head as the read head crosses a set of preexisting reference spirals written on the same data storage surface. The HDD is further configured to move the write head, after writing the servo spiral, from the second radial location back to the first radial location across a region of the data storage surface that includes reference spirals with unreadable segments. The HDD moves the write head from the second radial location back to the first radial location at a return radial velocity that is selected such that the write head crosses no consecutive reference spirals at an unreadable segment. The return radial velocity may be determined based on a simulation of write head motion with respect to the unreadable segments of the reference spirals, or on a solution to one or more deterministic equations that describe write head motion with respect to the unreadable segments of the reference spirals.

A method of writing a set of servo spirals on a disk surface, according to an embodiment, includes, while controlling movement of a write head from a first radial location on the disk surface to a second radial location on the disk surface, based on timing and location information from a set of first spirals, writing a second spiral with the write head, as a result of which overwritten spiral segments are generated where the second spiral crosses the first spirals; and after writing the second spiral, controlling movement of the write head from the second radial location to the first radial location based on timing and location information from the first spirals, wherein the movement of the write head from the second radial location to the first radial location is controlled to be at a radial velocity that has been set such that the write head crosses no more than one overwritten spiral segment for every two consecutive first spirals crossed.

A data storage device, according to other embodiments, includes a rotatable disk with a writable surface and a controller configured. The controller is configured to, while controlling movement of a write head from a first radial location on the writable surface to a second radial location on the writable surface, based on timing and location information from a set of first spirals, write a second spiral with the write head, as a result of which overwritten spiral segments are generated where the second spiral crosses the first spirals, and, after writing the second spiral, control movement of the write head from the second radial location to the first radial location based on timing and location information from the first spirals, wherein the movement of the write head from the second radial location to the first radial location is controlled to be at a radial velocity that has been set such that the write head crosses no more than one overwritten spiral segment for every two consecutive first spirals crossed.

BRIEF DESCRIPTION OF THE DRAWINGS

So that the manner in which the above recited features of embodiments of the invention can be understood in detail, a more particular description of embodiments of the invention, briefly summarized above, may be had by reference to the appended drawings. It is to be noted, however, that the appended drawings illustrate only typical embodiments of this invention and are therefore not to be considered limiting of its scope, for the invention may admit to other equally effective embodiments.

For clarity, identical reference numbers have been used, where applicable, to designate identical elements that are common between figures. It is contemplated that features of one embodiment may be incorporated in other embodiments without further recitation.

DETAILED DESCRIPTION

Figure 1:
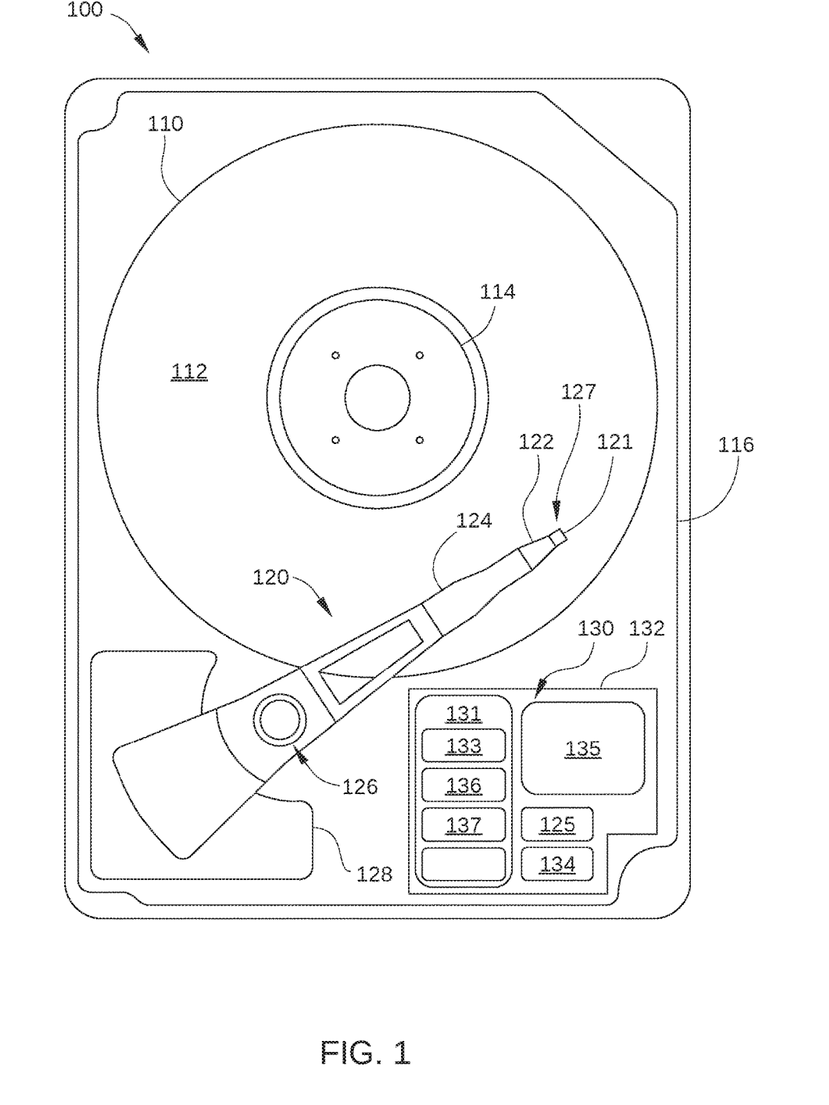
FIG. 1 is a schematic view of an exemplary hard disk drive, according to one embodiment.

FIG. 1 is a schematic view of an exemplary hard disk drive, according to one embodiment. For clarity, hard disk drive (HDD) 100 is illustrated without a top cover. HDD 100 includes a single storage disk 110 that is rotated by a spindle motor 114 and includes a plurality of concentric data storage tracks are disposed on a single surface 112 of storage disk 110. Spindle motor 114 is mounted on a base plate 116. An actuator arm assembly 120 is also mounted on base plate 116, and has a slider 121 mounted on a flexure arm 122 with a magnetic read/write head 127 that reads data from and writes data to the data storage tracks. Flexure arm 122 is attached to an actuator arm 124 that rotates about a bearing assembly 126. Voice coil motor 128 moves slider 121 relative to storage disk 110, thereby positioning read/write head 127 over a desired concentric data storage track. Spindle motor 114, read/write head 127, and voice coil motor 128 are coupled to electronic circuits 130, which are mounted on a printed circuit board 132.

In the embodiment illustrated in FIG. 1, HDD 100 includes a single storage disk 110 that is rotated by a spindle motor 114 and includes a plurality of concentric data storage tracks are disposed on a single surface 112 of storage disk 110. Alternatively, storage disk 110 includes two surfaces and/or HDD 100 includes multiple storage disks 110. In such embodiments, various embodiments as described herein can be implemented on a single surface of storage disk(s) 110.

Electronic circuits 130 include a read/write channel 137, a microprocessor-based controller 133, and a random-access memory (RAM) 134 (which may be a dynamic RAM and is used as a data buffer). In some embodiments, electronic circuits 130 may further include a flash memory device 135 and a flash manager device 136, for example when HDD 100 is configured as a hybrid drive. In some embodiments, read channel 137 and microprocessor-based controller 133 are included in a single chip, such as a system-on-chip 131. In some embodiments, HDD 100 may further include a motor-driver chip 125 that accepts commands from microprocessor-based controller 133 and drives both spindle motor 114 and voice coil motor 128. Read/write channel 137 communicates with the read/write head 127 via a preamplifier (not shown) that may be mounted on a flex-cable that is itself mounted on base plate 116 or actuator arm 120, or both.

When data are transferred to or from storage disk 110, actuator arm assembly 120 sweeps an arc between the inner diameter (ID) and outer diameter (OD) of storage disk 110. Actuator arm assembly 120 accelerates in one angular direction when current is passed in one direction through the voice coil of voice coil motor 128 and accelerates in an opposite direction when the current is reversed, thereby allowing control of the position of actuator arm assembly 120 and attached read/write head 127 with respect to storage disk 110. Voice coil motor 128 is coupled with a servo system known in the art that uses the positioning data read from servo wedges on storage disk 110 by read/write head 127 to determine the position of read/write head 127 over a specific data storage track. The servo system determines an appropriate current to drive through the voice coil of voice coil motor 128, and drives said current using a current driver and associated circuitry.

In order for HDD 100 to perform SSW and write the above-described servo wedges on storage disk 110 with the necessary precision for proper operation of HDD 100, position and timing information are provided to the disk drive servo system of HDD 100. The position and timing information that enable the internal servo system of HDD 100 to perform servo self-write (SSW) is typically in the form of reference spiral tracks or "servo spirals" written on storage disk 110. One embodiment of such servo spirals is illustrated in FIG. 2.

Figure 2:
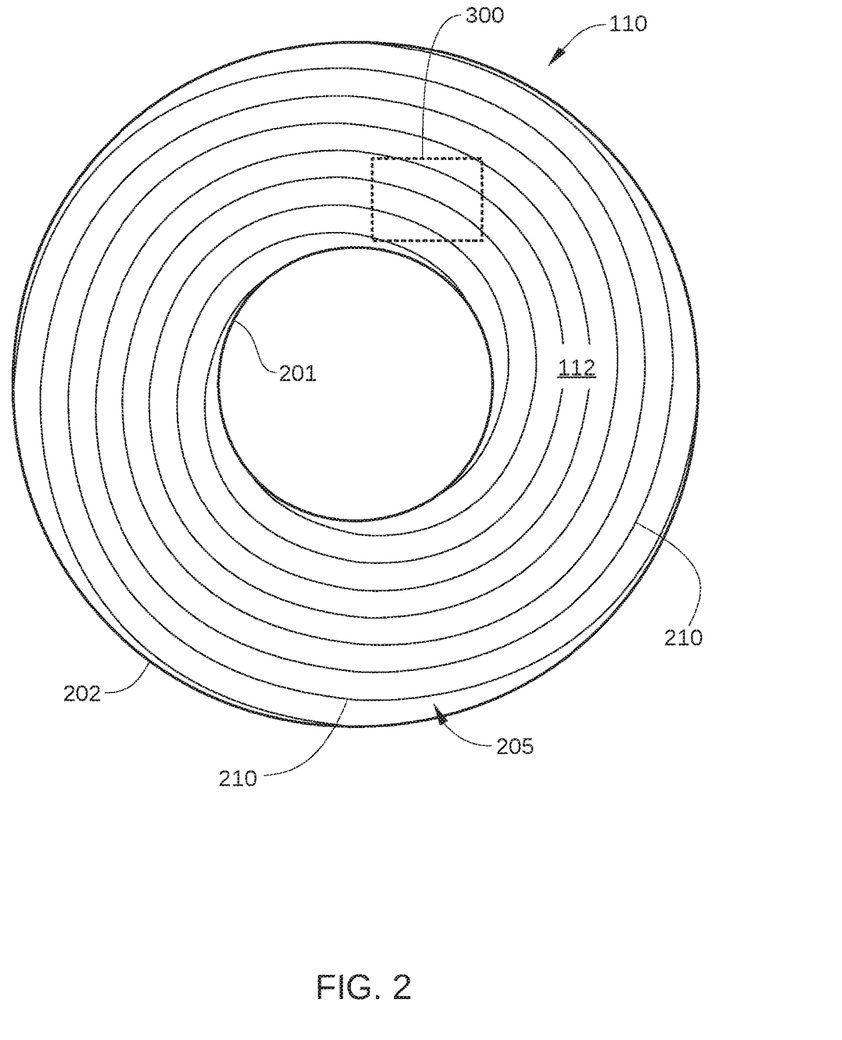
FIG. 2 illustrates a storage disk of the hard disk drive of FIG. 1 prior to undergoing a servo self-write process, according to one embodiment.

FIG. 2 illustrates storage disk 110 prior to undergoing a SSW process, according to one embodiment. As shown, storage disk 110 has a spiral set 205 written thereon that includes a plurality of reference spirals 210 that are each circumferentially spaced from adjacent reference spirals 210. It is noted that the number of reference spirals 210 in spiral set 205 is generally larger than that shown in FIG. 2, for example as few as ten or twenty, or as many as several hundred.

Spiral set 205 may be any set of reference spirals configured to provide timing and position information for the servo system of HDD 100 to position a write head while writing another set of reference spirals. Thus, in some embodiments, spiral set 205 is a set of coarse, i.e., initial, reference spirals. In such embodiments, spiral set 205 may be written onto a substantially blank surface 112 of storage disk 110 without the aid of external equipment using read/write head 127 and the servo system of HDD 100, for example, via a bootstrap spiral-writing process. In such a process, references spirals 210 of spiral set 205 are written by read/write head 127 while actuator arm assembly 120 is moved across surface 112 either by applying a suitable open loop voltage or current profile, or by using velocity control based on back EMF feedback. Alternatively, in some embodiments spiral set 205 is a set of fine reference spirals, i.e., reference spirals that are more accurately positioned than coarse reference spirals. In such embodiments, spiral set 205 is written onto surface 112 after surface 112 has another set of the above-described coarse spirals written thereon (not shown for clarity). In such embodiments, reference spirals 210 are typically written onto surface 112 using closed-loop tracking of the previously written coarse reference spirals, and can be used subsequently for writing a more accurately positioned set of servo spirals, such as final reference spirals, that enable the writing of servo sector information on surface 112 by HDD 100 in an SSW process. Thus, reference spirals 210 enable the generation of a set of more accurately positioned reference spirals on storage disk 110 using closed-loop control in the servo system of HDD 100.

Figure 3:
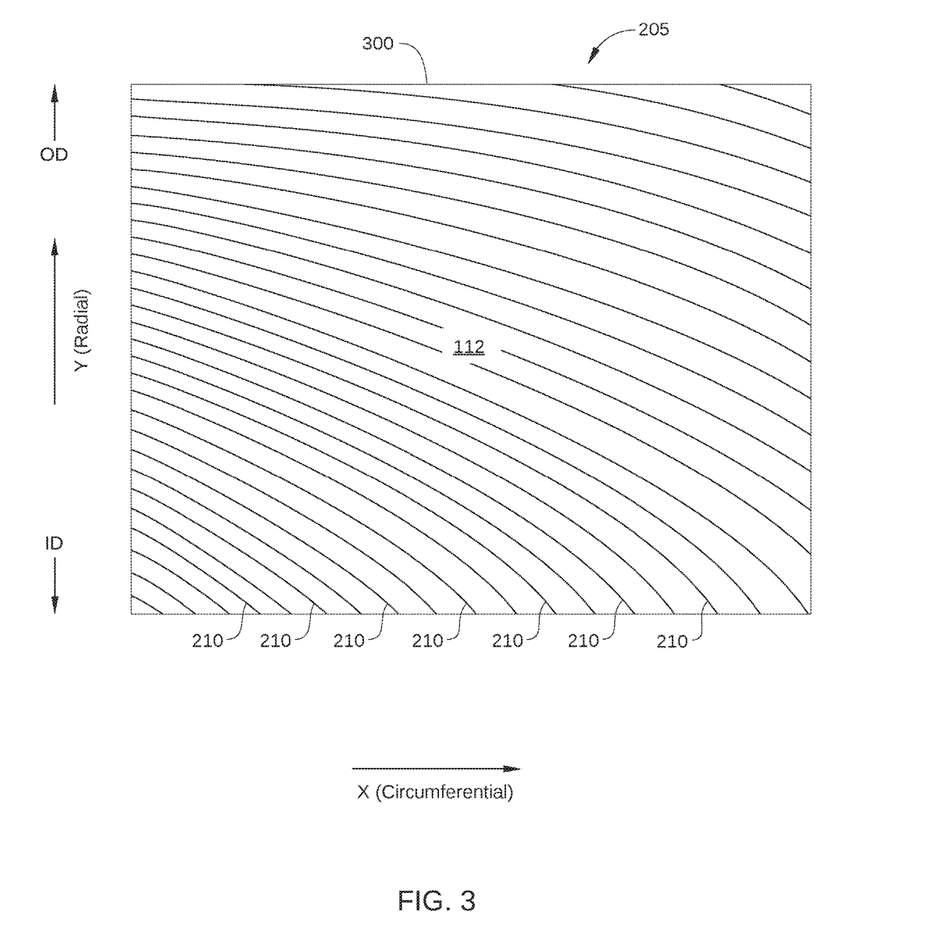
FIG. 3 is a schematic illustration of a portion of the storage disk indicated in FIG. 2, according to an embodiment.

FIG. 3 is a schematic illustration of a portion 300 of storage disk 110 indicated in FIG. 2, according to an embodiment. In the embodiment illustrated in FIG. 3, portion 300 is depicted prior to undergoing a SSW process, and therefore no servo wedges are present on surface 112. As shown, reference spirals 210 of spiral set 205 are formed on surface 112 of storage disk 110, and no other reference spirals have been formed on surface 112. Displacement along the x-axis in FIG. 3 is illustrated as circumferential (or angular) displacement, such as radians or degrees, while displacement along the y-axis is illustrated as linear (or radial) displacement. In the embodiment illustrated in FIG. 3, reference spirals 210 have been written on surface 112 from OD 202 to ID 201. Consequently, spiral set 205 is configured to provide timing and position information to the spiral system of HDD 100 as read/write head 127 passes over reference spirals 210 from ID 201 to OD 202, as shown in FIG. 4.

Figure 4:
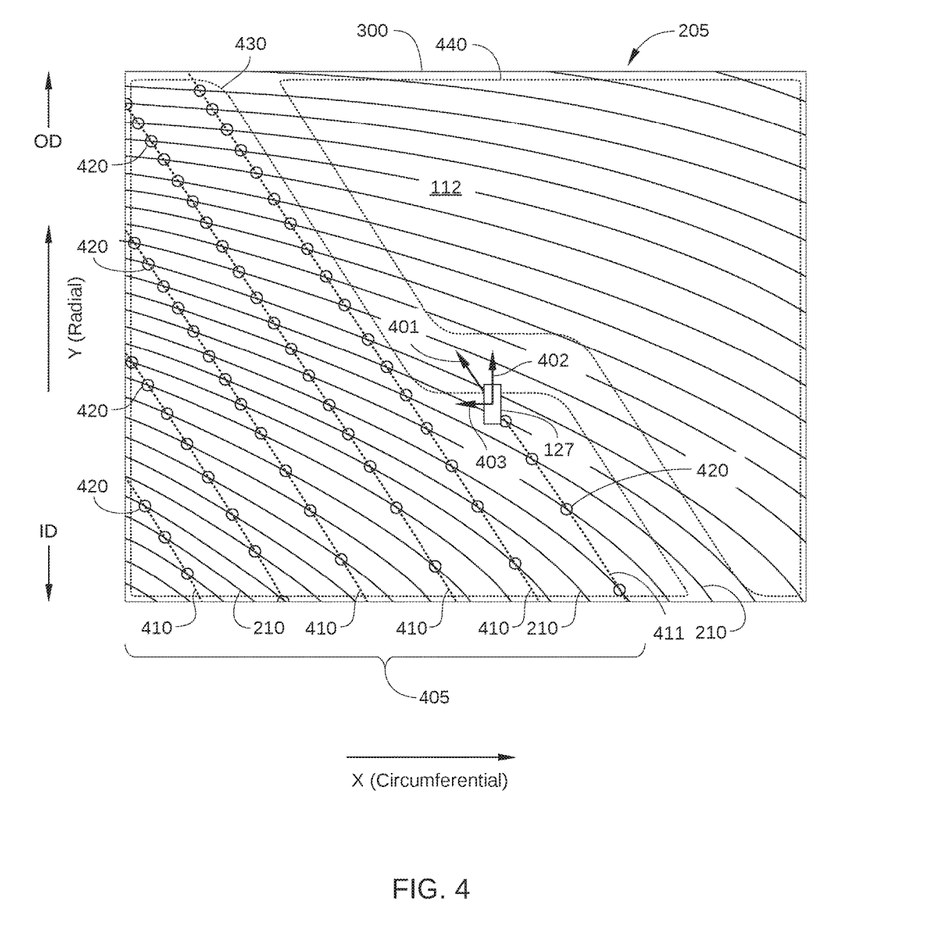
FIG. 4 is a schematic illustration of a portion of the storage disk indicated in FIG. 2 as an additional spiral set is written on a surface of a storage disk, according to an embodiment.

FIG. 4 is a schematic illustration of portion 300 as an additional spiral set 405 is written on surface 112, according to an embodiment. Spiral set 405 includes a plurality of references spirals 410 that are more accurately positioned than reference spirals 210 of spiral set 205. For example, when reference spirals 210 represent coarse reference spirals, reference spirals 410 are fine reference spirals that can be employed to write the final reference spirals that enable the SSW process. When reference spirals 210 represent fine reference spirals, reference spirals 410 are the final reference spirals employed to write a final servo pattern on surface 112. In either case, the radial location of a writer included in read/write head 127 is controlled using signals generated by a reader in read/write head 127 passing over reference spirals 210.

As shown, read/write head 127 moves radially from ID 201 to OD 202 while writing a latest spiral 411 of spiral set 405. Read/write head 127 moves across surface 112 with an instantaneous velocity 401 relative to surface 112 that includes a radial velocity 402 and an angular (i.e., circumferential) velocity 403. Radial velocity 402 is controlled by the servo system of HDD 100 and/or microprocessor-based controller 133, while angular velocity 403 is produced by rotation of storage disk 110. As read/write head 127 moves across surface 112 while writing latest spiral 411, portions of the preexisting reference spirals 210 are overwritten by latest spiral 411. That is, overwritten spiral segments 420 (circled) of reference spirals 210 are located at the intersection of a reference spiral 210 and a reference spiral 410, and are overwritten with the high-frequency transitions making up latest spiral 411. As a result, in overwritten spiral segments 420 the timing and position information associated with a reference spiral 210 no longer exists.

Because read/write head 127 cannot use spiral set 405 to control the radial position of read/write head 127 until most or all of reference spirals 410 in spiral set 405 have been written, the servo system of HDD 100 uses spiral set 205 to control the radial position of read/write head 127 while writing reference spirals 410. Therefore, when read/write head 127 is moved over a region of surface 112 that includes overwritten spiral segments 420 of reference spirals 210, such as damaged spiral region 430, the servo system of HDD 100 can lose control of the position of read/write head 127 when consecutive reference spirals 210 are crossed at overwritten spiral segments 420. It is noted that when writing additional reference spirals 410 in spiral set 405, such as latest reference spiral 411, read/write head 127 is generally located in undamaged spiral region 440, and the servo system of HDD 100 receives the requisite timing and position information from reference spirals 210 to continue the process of writing reference spirals 410. However, when read/write head 127 completes writing a reference spiral 410 and is returned to ID 201, read/write head 127 necessarily crosses damaged spiral region 430, and can encounter numerous unreadable segments of reference spirals 210, as shown in FIG. 5.

Figure 5:
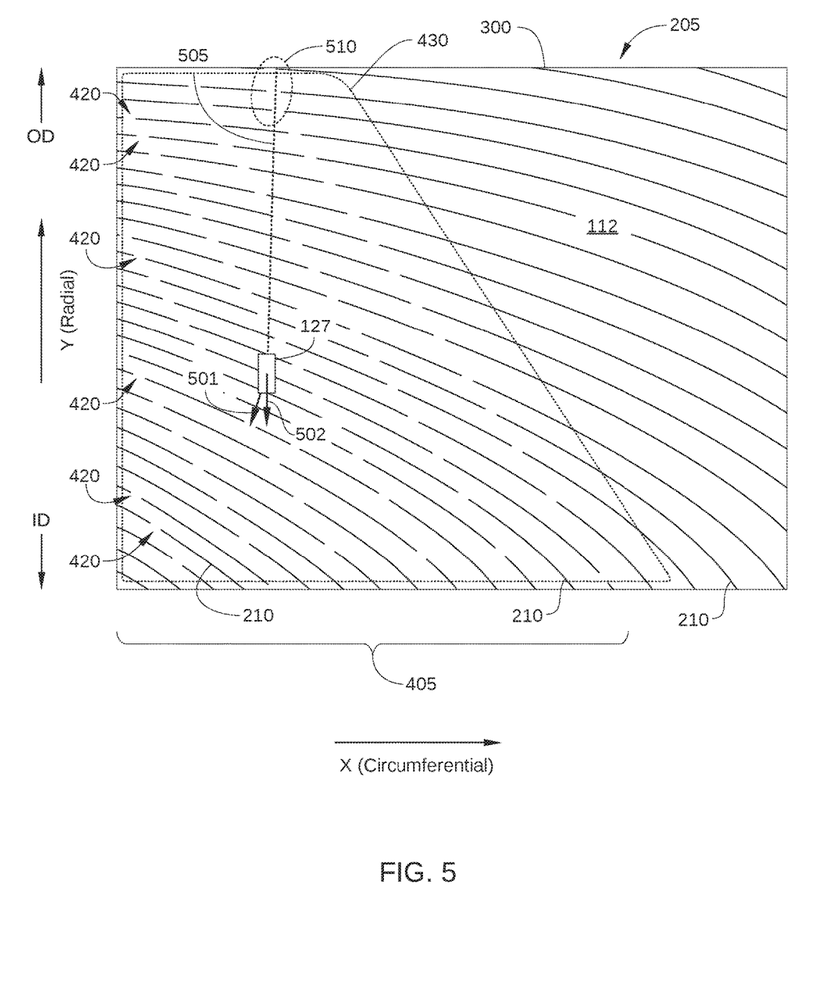
FIG. 5 is a schematic illustration of a portion of the storage disk indicated in FIG. 2 as a read/write head is moved across a damaged spiral region of a storage surface at an instantaneous velocity.

FIG. 5 is a schematic illustration of portion 300 as read/write head 127 is moved across damaged spiral region 430 of surface 112 at an instantaneous velocity 501. Instantaneous velocity 501 includes a radial velocity component 502 that is controlled by the servo system of HDD 100 and/or microprocessor-based controller 133. Radial velocity component 502 may be a different radial velocity than radial velocity 402, which is employed while writing reference spirals 410. In FIG. 5, read/write head 127 is being returned to ID 201 to begin writing an additional reference spiral 410 after completing latest spiral 411 (shown in FIG. 4). Damaged spiral region 430 includes a plurality of overwritten spiral segments 420, depicted as gaps in reference spirals 210. For clarity, reference spirals 410 of spiral set 405 are omitted from FIG. 5.

As shown, read/write head 127 follows a path 505 that crosses numerous overwritten spiral segments 420, for example in region 510. As is well-known in the art, failure to receive timing and position information from an expected spiral location can adversely affect operation of the servo system of a disk drive. In particular, failure to receive timing and position information from two or more consecutive spirals is likely to cause the servo system of a disk drive to loose track of the radial location of a read/write head and/or the indices of the reference spirals, and failure to receive timing and position information from a larger number of consecutive spirals, e.g. three, four, five, or more, is certain to cause the servo system of the disk drive to loose track of read/write head radial location and of reference spiral indices. According to embodiments, the servo system of HDD 100 is configured to move read/write head 127 across damaged spiral region 430 at a return radial velocity such that read/write head 127 crosses no consecutive reference spirals 210 at an overwritten spiral segment 420. One such embodiment is illustrated in FIG. 6.

Figure 6:
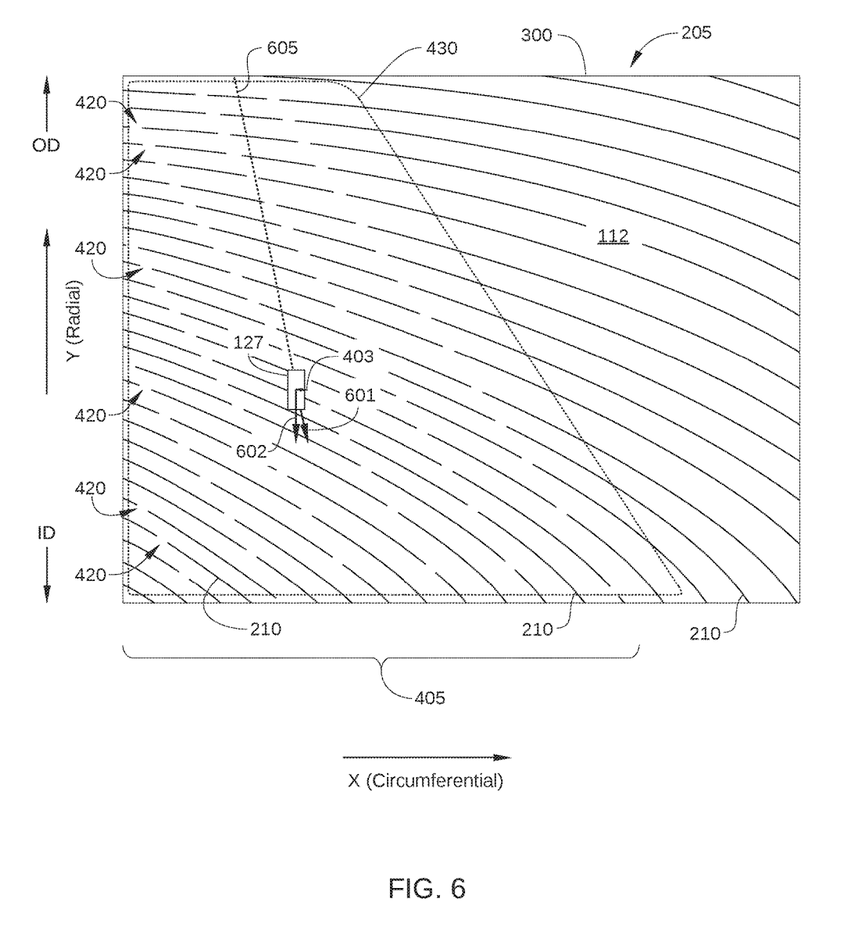
FIG. 6 is a schematic illustration of a portion of the storage disk indicated in FIG. 2 as a read/write head is moved across a damaged spiral region of a storage surface, according to an embodiment.

FIG. 6 is a schematic illustration of portion 300 as read/write head 127 is moved across damaged spiral region 430 of surface 112, according to an embodiment. In FIG. 6, read/write head 127 is being returned to ID 201 to begin writing an additional reference spiral 410 after completing latest spiral 411 (reference spirals 410 and latest spiral 411 are omitted from FIG. 6 for clarity). Read/write head 127 moves across surface 112 along a path 605 with an instantaneous velocity 601 relative to surface 112 that includes a radial velocity 602 and an angular (i.e., circumferential) velocity 403. Radial velocity 602 is controlled by the servo system of HDD 100 and/or microprocessor-based controller 133, and is selected such that read/write head 127 crosses no consecutive reference spirals 210 at an overwritten spiral segment 420. Angular velocity 403 is described above in conjunction with FIG. 4.

Although damaged spiral region 430 includes a plurality of overwritten spiral segments 420 in each of reference spirals 210, path 606 of read/write head 127 crosses no consecutive reference spirals 210 at an overwritten spiral segment 420. That is, read/write 127 crosses no more than one overwritten spiral segment 420 spiral segment for every two consecutive reference spirals 210 crossed in spiral set 205. Because the servo system of HDD 100 is configured to recover from missing timing and position information from a single non-consecutive reference spiral, moving read/write head 127 across damaged spiral region 430 at radial velocity 602 ensures that the servo system of HDD 100 does not experience an error due to overwritten spiral segments 420.

According to embodiments, the return radial velocity described above for read/write head 127 (i.e., radial velocity 602) can be determined for HDD 100 based on a simulation of the motion of read/write head 127 with respect to overwritten spiral segments 420 of reference spirals 210. The results of one such simulation are shown in FIG. 7.

Figure 7:
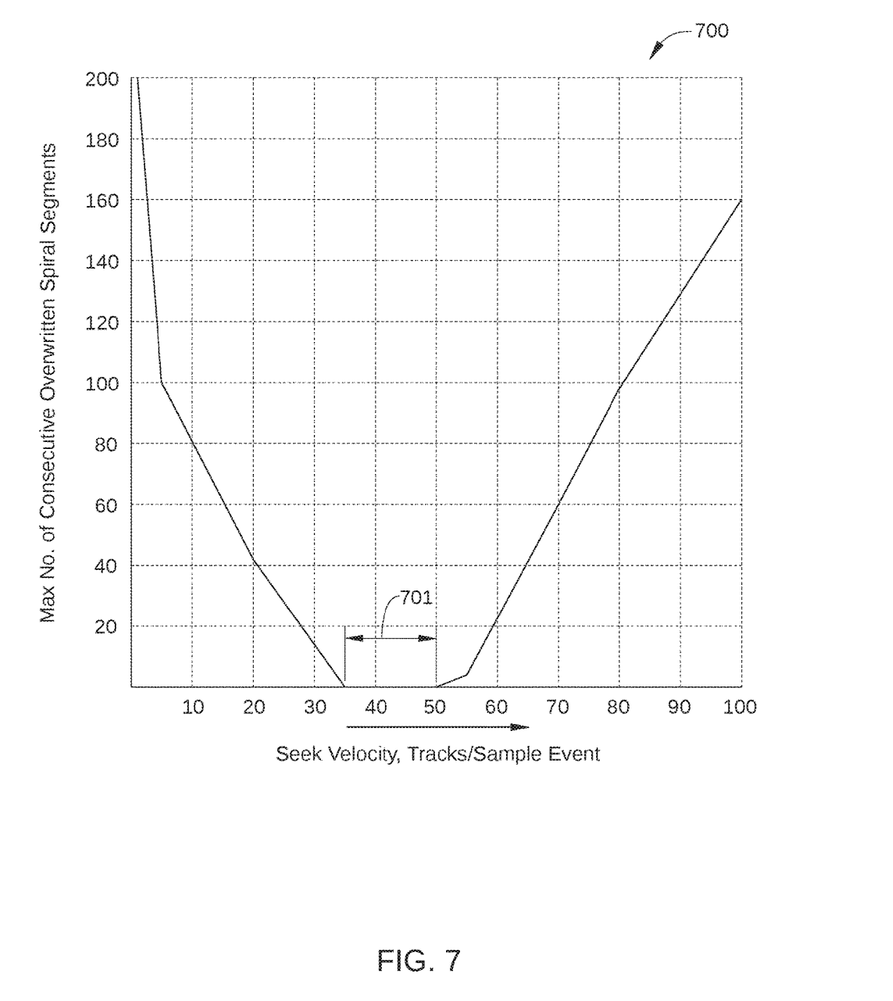
FIG. 7 is a graph showing the results of a simulation predicting a maximum number of consecutive reference spirals that are crossed by a read/write head for different return radial velocities, according to an embodiment.

FIG. 7 is a graph 700 showing the results of a simulation predicting a maximum number of consecutive reference spirals 210 that are crossed by read/write head 127 for different return radial velocities, according to an embodiment. Graph 700 indicates a maximum number of consecutive overwritten spiral segments 420 crossed by read/write head 127 when read/write head 127 is moved from one edge of surface 112 (e.g., OD 202) to an opposing edge (e.g., ID 201) at a particular radial velocity. In generating graph 700, the simulation is applied to a specific configuration of HDD 100 and a specific spiral set 205 of reference spirals 210. Thus, the results of the simulation will be different for each configuration of HDD 100 and for each spiral set 205. For example, when the simulation is run assuming spiral set 205 is a specific set of 16 coarse reference spirals, the results will be different than when spiral set 205 is assumed to be a specific set of 64 fine reference spirals.

Graph 700 indicates that when moving read/write head 127 at a radial velocity within a range 701 of beneficial velocities, a maximum of zero consecutive reference spirals 210 are crossed by read/write head 127. For example, for the particular scenario simulated to generate graph 700, range 701 of beneficial velocities includes velocities of between about 35 and 50 tracks per position sample (i.e., tracks per spiral crossing). Thus, at such radial velocities, read/write head 127 crosses no more than one overwritten spiral segment before crossing another spiral at an undamaged location. In other words, at a radial velocity included in range 701 of beneficial velocities, read/write head crosses no more than one overwritten spiral segment for every two consecutive spirals, which is well within the limit that the servo system for HDD 100 can tolerate for missed timing and position information.

In some embodiments, the simulation for generating graph 700 is based on nominal locations of reference spirals 210. That is, in such embodiments, the simulation for generating graph 700 assumes that reference spirals 210 have each been written using an identical radial velocity profile, and therefore have ideal location and shape and are circumferentially separated from each other by a substantially uniform angular separation at any particular radial location on storage disk 110. In other embodiments, the simulation for generating graph 700 includes a certain magnitude of variation in positioning of spirals in the first set of spirals. In such embodiments, range 701 of beneficial velocities may be narrower than that for a simulation based on nominal locations of reference spirals 210.

In some embodiments, the return radial velocity described above for read/write head 127 (i.e., radial velocity 602) can be determined for HDD 100 based on the solution of one or more deterministic equations describing write head motion with respect to the overwritten spiral segments. When moving at a particular radial velocity across storage disk 110, read/write head 127 follows a well-defined path that can be determined by one of skill in the art for a given rotational velocity of storage disk 110 using by well-known trigonometric and kinematic techniques. Generally, such paths that intersect with overwritten spiral segments 420 can be determined based on the radial spacing of the overwritten spirals, the radial velocity at which the overwritten spirals were written, the radial spacing of the overwriting spirals, and the radial velocity at which the overwriting spirals are being written. For example, in a simple example, when the radial spacing of the overwritten spirals and the overwriting spirals is the same, radial return velocities to be avoided, i.e., radial velocities at which read/write head 127 intersects overwritten spiral segments, include the radial velocity $V_w$ at which the overwritten spirals were written, one third of $V_w$, one fifth of $V_w$, one seventh of $V_w$, and so on. Thus, a return radial velocity at which read/write head 127 intersects no overwritten spiral segments or very few can be selected based on such radial return velocity that are to be avoided. In more general cases, in which the radial spacing of the overwritten spirals and the overwriting spirals is the not the same, radial return velocities to be avoided are described by more complex relationships. Such relationships can be readily determined by one of skill in the art upon reading the disclosure provided herein.

Figure 8:
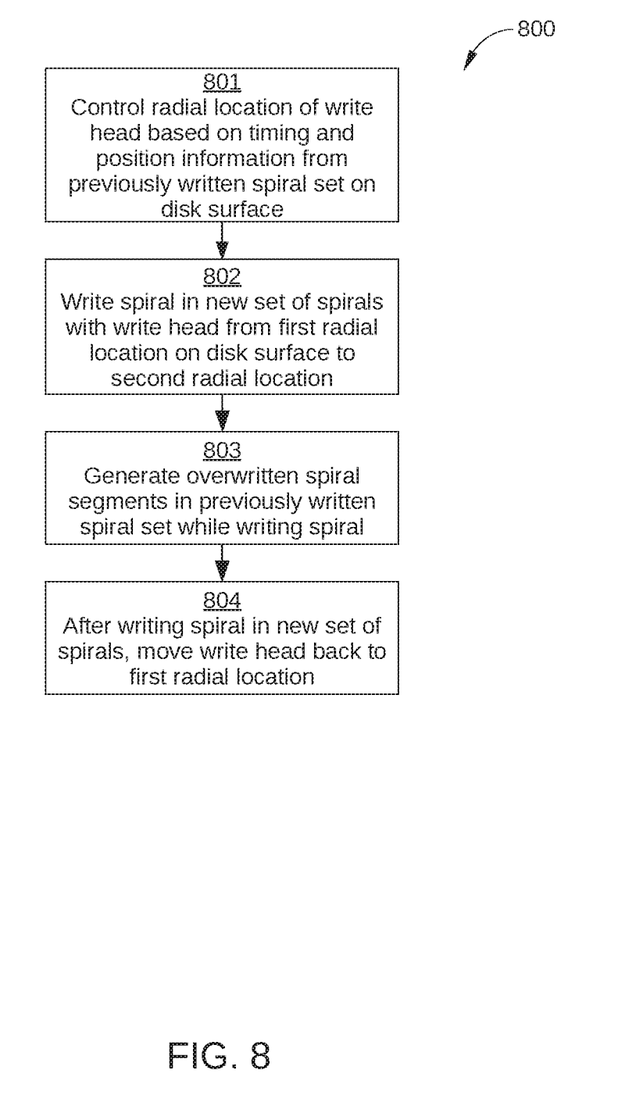
FIG. 8 sets forth a flowchart of method steps of writing a set of servo spirals on a disk surface, according to an embodiment.

FIG. 8 sets forth a flowchart of method steps of writing a set of servo spirals on a disk surface, according to an embodiment. Although the method steps are described in conjunction with HDD 100 of FIGS. 1-7, persons skilled in the art will understand that the method steps 800 may be performed with other hard disk drives. The control algorithms for the method steps may reside in and/or be performed by microprocessor-based controller 133 and/or any other suitable control circuit or system, including an external host. In some embodiments, method 800 may be employed during an SSW process in which one set of reference spirals is written on a recording surface of HDD 100 while read/write head 127 servos off a previously written set of reference spirals on the same recording surface.

As shown, a method 800 begins at step 801, where microprocessor-based controller 133 (or other suitable control circuit or system) controls the radial location of a write head included in read/write head 127 based on timing and location information from a previously written spiral set, such as spiral set 205. For example, spiral set 205 may be a set of coarse reference spirals written on a blank surface 112. It is noted that spiral set 205 includes reference spirals 210 that are configured to include timing and position information having a first frequency. By contrast, each spiral in a spiral set being written while servoing off spiral set 205, such as spiral set 405, generally includes timing and position information having a second frequency that is different than the first frequency. Thus, the servo system of HDD 100 can pass over reference spirals in spiral set 405 without erroneously interpreting signals generated thereby as pertinent timing and position information.

In step 802, microprocessor-based controller 133 (or other suitable control circuit or system), writes a spiral with a write head included in read/write head 127 on the same disk surface 112 on which spiral set 205 is written. The spiral is written from a first radial location on disk surface 112 (e.g., ID 201 or other launch point for writing spirals) to a second radial location on disk surface 112 (e.g., OD 202 or other end point for writing spirals). The spiral written in step 802 is a spiral being added to the new set of spirals being written on disk surface 112, such as spiral set 405. The spiral is written in step 802 while controlling the radial location of the write head via timing and position information from spiral set 205.

In step 803, microprocessor-based controller 133 (or other suitable control circuit or system) generates one or more overwritten spiral segments 420 while writing the additional spiral. That is, as the writer in read/write head 127 passes over reference spirals 210 in spiral set 205, overwritten spiral segments 420 are formed by overwriting a portion of one or more reference spirals 210 in spiral set 205. Typically, each reference spiral 210 in spiral set 205 is overwritten in multiple locations in step 803.

In step 804, after writing the additional spiral to spiral set 405, microprocessor-based controller 133 (or other suitable control circuit or system) moves read/write head 127 back to the first radial location, i.e., the spiral launch point) at a return radial velocity. In some embodiments, the return radial velocity is set to a radial velocity indicated by a simulation to be within range 701 of beneficial velocities. In other embodiments, the return radial velocity is set to a radial velocity based on the solution of one or more deterministic equations that can be solved to provide one or more velocities suitable for use as the return radial velocity of read/write head 127. In either case, the return radial velocity is set in step 805 to a velocity at which read/write head 127 crosses no more than one overwritten spiral segment 420 for every two consecutive spirals crossed in spiral set 205. It is noted that in step 804, the motion of read/write head 127 is controlled based on timing and location information from spiral set 205, even though most or all of reference spirals 210 include multiple overwritten spiral segments 420.

In the embodiments described above, a single-surface blank-disk SSW process is performed in an HDD that includes only a single data storage surface. The embodiments can be beneficially employed in an HDD that includes multiple storage surfaces, such as a disk with two storage surfaces, or multiple disks with multiple storage surfaces. As track pitch continues to decrease in modem HDDs, an SSW process is more likely to generate accurately positioned servo wedges on a surface when the final and most precisely written servo spirals that control the writing of the servo wedges are disposed on that surface. Thus, when final servo spirals are written on every storage surface of an HDD, at least one of these surfaces will have the final servo spirals written thereon while overwriting the set of spirals used to control the writing process. In such situations, embodiments described herein can be beneficially employed.

In sum, embodiments herein provide systems and methods for single-surface blank-disk SSW on an HDD. The HDD is configured to move a read head over a region of a storage surface that includes unreadable segments of reference spirals that have been overwritten by a reference spiral in a set of spirals that is currently being written on the storage surface. By moving the read head across the region of the storage surface at a return radial velocity that is selected such that the write head crosses no consecutive reference spirals at an unreadable segment, the servo system of the HDD does not experience an error due to crossing multiple consecutive reference spirals at unreadable segments. Thus, a set of spirals that includes partially damaged reference spirals can be employed to control the position of a read head. Consequently, a second surface is not required for the set of spirals employed in controlling the writing process.

While the foregoing is directed to embodiments of the present invention, other and further embodiments of the invention may be devised without departing from the basic scope thereof, and the scope thereof is determined by the claims that follow.

We claim:

1. A method of writing a set of servo spirals on a disk surface, the method comprising:
    while controlling movement of a write head from a first radial location on the disk surface to a second radial location on the disk surface, based on timing and location information from a set of first spirals, writing a second spiral with the write head, as a result of which overwritten spiral segments are generated where the second spiral crosses the first spirals; and
    after writing the second spiral, controlling movement of the write head from the second radial location to the first radial location, while not writing any spiral with the write head, based on timing and location information from the first spirals,
    wherein the movement of the write head from the second radial location to the first radial location is controlled to be at a radial velocity that has been set such that the write head crosses no more than one overwritten spiral segment for every two consecutive first spirals crossed.

2. The method of claim 1, further comprising:
    while controlling movement of the write head from the first radial location on the disk surface to the second radial location on the disk surface, based on timing and location information from the set of first spirals, writing an additional second spiral with the write head, as a result of which additional overwritten spiral segments are generated where the additional second spiral crosses the first spirals; and
    after writing the additional second spiral, controlling movement of the write head from the second radial location to the first radial location, while not writing any spiral with the write head, based on timing and location information from the first spirals,
    wherein the movement of the write head from the second radial location to the first radial location is controlled to be at the radial velocity.

3. The method of claim 1, wherein controlling movement of the write head from the second radial location to the first radial location comprises controlling movement of the write head write head based on timing and location information from the first spirals.

4. The method of claim 1, wherein the radial velocity is selected based on a simulation of write head motion with respect to the overwritten segments.

5. The method of claim 4, wherein the simulation assumes nominal positioning of spirals in the first spirals.

6. The method of claim 4, wherein the simulation includes a certain magnitude of variation in positioning of spirals in the first spirals.

7. The method of claim 1, wherein the radial velocity is selected based on the solution of one or more deterministic equations describing write head motion with respect to the overwritten spiral segments.

8. The method of claim 1, wherein writing the second spiral comprises moving the write head from the first radial location to the second radial location at a write radial velocity, and the radial velocity is not equal to the write radial velocity.

9. The method of claim 1, wherein controlling radial location of the write head based on timing and location information from the first spirals comprises receiving signals from a read head associated with the write head as the read head passes over a spiral in the first spirals.

10. The method of claim 1, wherein moving the write head to the first radial location from the second radial location at the radial velocity comprises moving the write head over a region of the disk surface that includes the one or more overwritten spiral segments.

11. The method of claim 1, wherein writing the second spiral from the first radial location on the disk surface to the second radial location on the disk surface comprises moving the write head over a region of the disk surface that includes no overwritten spiral segments.

12. The method of claim 1, wherein each of the one or more overwritten spiral segments includes no timing or position information from the first spirals.

13. The method of claim 1, wherein each of the first spirals includes timing and position information having a first frequency and the second spiral includes timing and position information having a second frequency that is different than the first frequency.

14. The method of claim 13, wherein the each of the one or more overwritten spiral segments includes position and timing information having the first frequency.

15. The method of claim 1, wherein the first radial position corresponds to a launch point for writing spirals in a different set of spirals than the set of first spirals.

16. A data storage device comprising:

a rotatable disk with a writable surface; and a controller configured to:

while controlling movement of a write head from a first radial location on the writable surface to a second radial location on the writable surface, based on timing and location information from a set of first spirals, write a second spiral with the write head, as a result of which overwritten spiral segments are generated where the second spiral crosses the first spirals; and after writing the second spiral, control movement of the write head from the second radial location to the first radial location, while not writing any spiral with the write head, based on timing and location information from the first spirals, wherein the movement of the write head from the second radial location to the first radial location is controlled to be at a radial velocity that has been set such that the write head crosses no more than one overwritten spiral segment for every two consecutive first spirals crossed.

17. The data storage device of claim 16, wherein each of the one or more overwritten spiral segments includes no timing or position information from the first spirals.

18. The data storage device of claim 16, wherein each of the first spirals includes timing and position information having a first frequency and the second spiral includes timing and position information having a second frequency that is different than the first frequency.

19. The data storage device of claim 16, wherein controlling movement of the write head from the second radial location to the first radial location comprises controlling movement of the write head write head based on timing and location information from the first spirals.

20. The data storage device of claim 16, wherein the radial velocity is selected based on a simulation of write head motion with respect to the overwritten segments.

* * * * *